Jan. 19, 1965   H. M. VALENTINE   3,166,358
FLUID PRESSURE SYSTEM AND CONTROL VALVE
Filed March 21, 1963
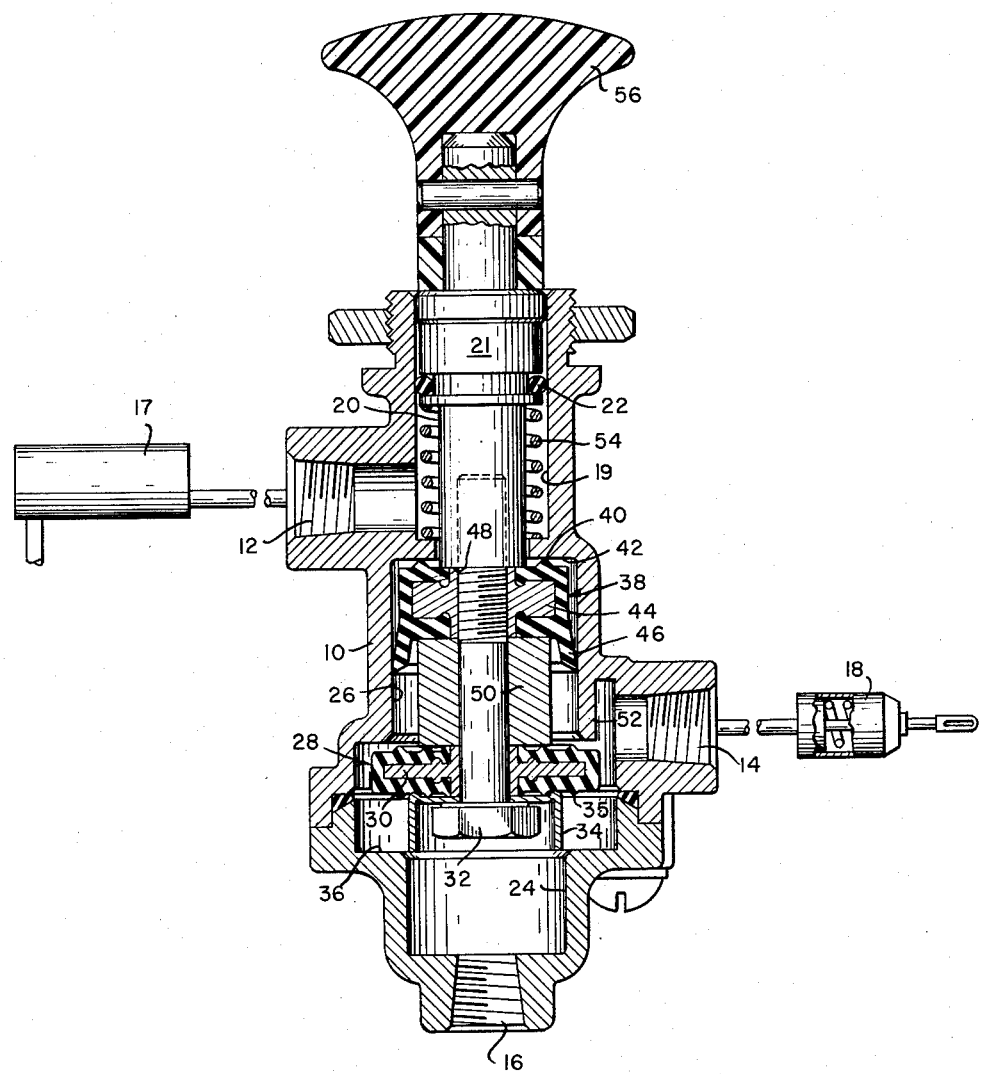
INVENTOR
Harry M. Valentine
BY *Scrivener and Parker*
ATTORNEY

United States Patent Office 3,166,358
Patented Jan. 19, 1965

3,166,358
FLUID PRESSURE SYSTEM AND CONTROL VALVE
Harry M. Valentine, Elyria, Ohio, assignor to Bendix-Westinghouse Automotive Air Brake Company, Cleveland, Ohio, a corporation of Delaware
Filed Mar. 21, 1963, Ser. No. 266,957
8 Claims. (Cl. 303—48)

This invention relates to fluid pressure systems and more particularly to a system including a valve for manually and automatically controlling fluid pressure actuated devices such as safety spring actuators for vehicle brakes.

In my co-pending application, Serial Number 142,725, filed October 3, 1961 and assigned to the same assignee as the present invention, there is disclosed a control valve which is automatically operable to allow safety spring brake actuators to apply the brakes when the system pressure drops to a predetermined value, and which is also manually operable at any time in order to apply the spring brakes for parking or for emergency operation. A particular feature of the co-pending application is the fact that when the outlet valve element has been moved to a position closing an exhaust port, an effective area of the element is exposed to inlet pressure to retain the outlet valve in its closed position at the same time that the pressure fluid at the inlet is connected to the outlet leading to the spring actuator. So long as the system pressure is above a predetermined pressure the outlet valve is retained in its closed position and the spring actuators are retained in their released position. However, should the pressure at the inlet start to fall because of leakage or for other reasons, the fluid pressure in the spring actuators also falls which may result in a gradual or creeping movement of the spring actuators towards their brake applied positions. This movement in most instances is insufficient to even partially apply the brakes, but where very heavy springs are utilized a fall in pressure to a level not quite below a safe value can cause the brakes to be partially applied by the springs at times when it is neither desirable nor necessary.

It is an object of the present invention to provide an improved system and a control valve therefor which eliminates the above problem and insures retention of the spring brake actuators in their fully released position until such time as the system pressure has fallen below a minimum safe operating level, whereupon the valve automatically fully releases all of the pressure in the actuators to effect controlled application of the brakes.

More particularly it is an object of the invention to provide a valve of the foregoing nature which serves to trap full system pressure in the spring actuators even though the supply pressure at the inlet port of the valve may fall below full system pressure with the valve being so arranged that no pressure escapes from the spring actuators until the supply pressure has fallen below a safe value whereupon the valve of the invention automatically exhausts all of the pressure fluid from the actuators to effect controlled application of the brakes.

In accordance with the invention the foregoing objects are accomplished by providing in the valve of the system a balancing piston having an opposed effective area substantially equal to the effective area of the outlet valve element, the balancing piston cooperating with check valve means which permits the one way passage of fluid pressure between the inlet of the valve and the spring actuator but prevents the reverse flow of pressure fluid from the actuators to the inlet should the latter pressure fall below an initial high value. Instead of the effective area of the outlet valve serving to retain the outlet valve in its closed position as in the valve of the co-pending application, the upper side of the balancing piston provides the required effective area for retaining the outlet valve closed so long as the pressure at the inlet is above a predetermined safe value. As in the valve of the co-pending application, a spring serves to move the outlet valve to its open or exhaust position when the pressure at the inlet falls below the minimum safe value thereby effecting automatic setting of the brakes by the spring actuators. One of the features of the present invention resides in improved means for restricting the flow of fluid from the actuators to atmosphere in order to avoid an abrupt or "dynamiting" brake application when the pressure at the source has fallen below a safe value.

The valve of the present invention will now be described in detail in conjunction with the accompanying single figure which is a cross sectional view of a valve incorporating the features of the present invention.

As previously mentioned, the valve of the present invention is particularly (though not exclusively) adapted for use in fluid pressure brake systems employing safety spring actuators and for detailed illustration and description of a typical system where the valve of the present invention may be employed, reference is made to the aforementioned co-pending application, Serial Number 142,725.

The control valve of the present invention, which may be substituted for the corresponding valve of the co-pending application, comprises a casing 10 provided with inlet, outlet and exhaust ports 12, 14 and 16, the ports 12 and 14 being respectively adapted to be connected with a supply source of fluid pressure 17 and with one or more spring actuators 18. Casing 10 is also provided with a bore 19 for slideably receiving a valve plunger 20 having a piston part 21 provided with an O-ring seal 22. Casing 10 is provided at its lower end wtih a second bore 24 axially aligned with bore 18 and communicating with each of the bores in a central chamber 26. The lower end of the plunger 20 carries a valve member 28 of rubbery material having an outlet valve on its lower face. The valve member 28 is of annular sleeve-like shape and is directly supported by an annular metallic insert 30 which is secured to the lower end of the plunger by means of a machine screw 32. A metallic cup-shaped guide member 34 loosely slideable in bore 24 is interposed between the head of screw 34 and a flange on the insert 30, as shown, for the purpose of restricting the exhaust to obtain the dual feature of a slow upward movement of the valve element 38 to eliminate the impact load of the valve bead 40 on the seat 42 and also to gradually release the air from the actuator to prevent an instantaneous or dynamiting application of the spring brakes. The outlet valve is constituted by an annular bead 35 adapted to contact a face 36 of the casing which affords an outlet valve seat for the outlet valve when the bead 35 is in engagement with face 36.

Also carried by the plunger 20 is a second valve member 38 having an inlet valve bead 40 on its upper surface adapted to sealingly contact a face 42 of the casing 10 which affords an inlet valve seat for the valve 40. The valve member 38 is of rubbery material having a sleeve-like configuration adapted to be received on an annular metallic insert 44 and the member 38 is provided with a downwardly extending skirt 46 which serves as a one way check valve to permit the flow of fluid from the inlet port 12 to the outlet port 14 when the outlet valve is closed, but prevents flow in the opposite direction. An upper annular surface of the insert 44 engages a shoulder 48 on the plunger 20 while the lower annular surface engages the upper edge of a spacer element 50 whose lower surface is in engagement with a flange on the lower valve insert 30. It will be apparent from an inspection of the drawings that the space between the skirt 46 of valve element 38 and the upper surface of the lower valve element 28 is in continual communication with the outlet port 14 beneath a wall part 52 which is integral with the casing and serves as a guide for the skirt part 46 of the upper valve element 38.

A spring 54 is confined between a portion of the casing 10 and the plunger 20 and constantly tends to urge the plunger upwardly to maintain the inlet valve closed. When closed, the effective cross sectional area defined by the inlet valve bead 40 is less than the cross sectional effective area of the O-ring 22 so that when the parts of the valve are in the brake release or emergency position of the drawing the parts will remain in the shown position even though the pressure at the inlet port 12 rises to full reservoir pressure. The valve may, however, be manually moved from the position of the drawing, by means of a handle 56, downwardly to the brake release position whereby the outlet valve bead 35 seats on surface 36 to close exhaust port 16 while simultaneously opening inlet valve 40 to permit inlet pressure to flow from port 12 past skirt 46 and through outlet port 14 to the spring brake actuators.

In accordance with the invention, the cross sectional effective area defined by the bead of outlet valve 35 is selected to be substantially identical to the effective cross sectional area defined by the skirt 46 of the valve member 38. Hence it will be seen that when the outlet valve 35 is moved to its closed position the pressure in the spring actuator acting downwardly on the valve member 28 tending to retain the outlet valve closed is balanced by this same pressure acting upwardly on the equal but opposed area of the inner surface of the skirt 46, this pressure also acting against the skirt to move it radially outwardly into tight sealing engagement with the wall of the chamber 26. Thus, instead of the valve 28 being retained in its closed position by spring actuator pressure as in the valve of the co-pending application, a second or auxiliary pressure responsive balancing piston is afforded by the upper surface of the skirt 46 and the upper part of the valve element 38 between the plunger shoulder 48 and the outer circumferential upper edge of the valve element; that is to say, the effective piston area for retaining the outlet valve closed comprises the entire cross sectional area of the chamber 26 less the cross sectional area of the chamber 19. (This differential area times a predetermined reservoir pressure plus frictional forces is equal to the force of the spring 54, under which condition the valve is lapped or in balanced position. Any drop in reservoir pressure below the predetermined minimum will cause the outlet valve 35 to open and apply the spring actuators.)

The operation of the valve of the invention should be apparent from the foregoing description. It should be particularly noted that unlike the valve of the co-pending application, the valve of the present invention is pressure responsive solely to the pressure of the source 17 existing at the inlet port 12, and the pressure prevailing in the spring actuators 18 has no effect whatever on the actuation of the valve other than as a sealing force for skirt 46 which serves to trap the pressure in the spring actuator until such time as the outlet valve 28 is moved toward the open position of the drawing. By correlating the strength of spring 54 and the effective area of O-ring 22 with the opposing effective area defined by the upper surface of valve member 38, it will be apparent that the valve may be constructed to respond to any predetermined low pressure below which it is not safe to operate the vehicle. Until such time as the valve moves to the release position in response to fall of inlet pressure, the maximum pressure existing in the supply reservoir 17 is retained in the spring actuators 18 to positively prevent creep of the actuators towards their brake applied positions so that no undesired or unnecessary partial application of the brakes by the spring actuators is achieved until the supply pressure actually falls to an unsafe value. Upon this occurrence, the cup shaped restrictor member 34 serves to limit or meter the escape of fluid from the actuators to atmosphere so that the brakes are applied at a controlled rate rather than suddenly, which occasionally results in accidents.

It will be apparent that the valve of the invention is susceptible of a variety of uses other than as a control for spring brakes and is also susceptible of modifications without departing from the scope and spirit of the appended claims.

What is claimed is:

1. A valve for the control of fluid pressure comprising a casing having first and second axially aligned bores and a chamber between said bores communicating with both of said bores, said chamber being provided with opposed inlet and outlet valve seats, a movable valve plunger having a first pressure responsive piston member slideably mounted in the first of said bores, valve means carried by said plunger and positioned in said chamber, said valve means having opposed spaced apart inlet and outlet valves for respective cooperation with said inlet and outlet valve seats upon movement of said plunger in opposite directions, a second pressure responsive piston carried by said plunger intermediate said inlet and outlet valves and slideably mounted in said chamber in axially spaced relationship with respect to said outlet valve, said second piston having an effective cross sectional area on a first side thereof facing said outlet valve substantially equal and opposed to the effective area of said outlet valve, said casing having an inlet port, an outlet port and an exhaust port, said inlet port being in constant communication with said first bore, the exhaust port being in constant communication with the second bore and the outlet port being in constant communication with said chamber in the space between said second piston and said outlet valve, one way check valve means carried by said second piston to permit the flow of fluid past said second piston from said inlet to said outlet port but not in the reverse direction upon opening of said inlet valve, said second piston having an effective area on a second side thereof opposite said first side greater than the effective cross sectional area of said first piston in said first bore, fluid pressure at said inlet port constantly acting on said first piston member when said inlet valve is closed to maintain the latter in closed position and acting on the area of the second side of said second piston when said outlet valve is closed to maintain the outlet valve closed, and resilient means positioned in said first bore around said plunger and interposed between said first piston and the casing for closing the inlet valve and opening the outlet valve when the fluid pressure at said inlet port drops to a predetermined value.

2. A valve in accordance with claim 1 wherein said one way check valve means comprises a pressure responsive, radially expansible skirt extending in the direction of said exhaust valve said skirt being radially collapsible inwardly to permit the passage of fluid past said piston when the pressure on the inlet valve side of said piston exceeds the pressure on the outlet valve side of said piston.

3. The valve in accordance with claim 1 including fluid restrictor means positioned adjacent said exhaust port to limit the rate of fluid flow to atmosphere through said port upon opening of said outlet port.

4. A valve for the control of fluid pressure comprising a casing having first and second axially aligned inlet and exhaust bores and a chamber between said bores communicating with both of said bores, said chamber being provided with opposed inlet and outlet valve seats, a piston slideably mounted in said chamber and having one side exposed to the exhaust valve seat and other side exposed to the inlet valve seat, inlet and exhaust valves connected to said piston on opposite sides thereof for movement therewith and cooperating with said valve seats to connect said inlet bore with said chamber while disconnecting said exhaust bore from said chamber and vice versa, said exhaust valve being connected to said piston in spaced relationship and having an effective cross sectional area substantially equal and opposed to the effective cross sectional area of the side of said piston facing said valve, inlet and exhaust ports in said casing respectively continuously connected to said inlet and exhaust bores, an outlet port in said casing continuously connected to said chamber in the space between said exhaust valve and said piston, a one way check valve carried by said piston clear of said inlet valve for permitting the flow of fluid from the inlet bore past said piston to the outlet port upon opening of said inlet valve but preventing flow in the reverse direction, the effective cross sectional area of the piston on the side thereof carrying said inlet valve being greater than the effective cross sectional area of the inlet valve, fluid pressure at said inlet port when said inlet valve is open and said exhaust valve is closed acting on said piston to maintain said inlet and exhaust valves in their respective open and closed positions, and resilient means positioned in said casing and acting on said piston for moving the same to a position closing said inlet valve and opening said exhaust valve when the fluid pressure at said inlet port drops to a predetermined value.

5. The valve of claim 3 including a second piston positioned in said inlet bore and connected to said first piston, said second piston having a greater effective cross sectional area than said inlet valve, fluid pressure at said inlet port constantly acting on said second piston when said inlet valve is closed to maintain said inlet valve in closed position.

6. The valve of claim 4 including manual means for effecting movement of said piston and said valves.

7. A vehicle fluid pressure brake system having a source of fluid pressure, and including a spring operated, fluid pressure released actuator for mechanically applying the brake when the fluid pressure from said source is below a predetermined pressure, a valve including a casing having an inlet port connected to said source and an outlet port connected to said spring actuator and an exhaust port connected to atmosphere, axially aligned inlet and exhaust bores in said casing respectively connected to said inlet and exhaust ports, a chamber between said bores and communicating with both of said bores, said chamber being provided with opposed outlet and inlet valve seats, a movable valve plunger having a pressure responsive piston slideably mounted in the first of said bores, axially spaced inlet and outlet valves carried by said plunger and positioned in said chamber for respective cooperation with said inlet and outlet valve seats upon movement of said plunger in opposite directions, a second piston carried by said plunger and positioned in said chamber in spaced relationship with respect to said exhaust valve, the side of said piston facing said exhaust valve having an effective cross sectional area substantially equal to and opposed to the effective cross sectional area of said exhaust valve, a one way check valve carried by said piston for permitting the flow of fluid from said inlet port past said piston to the space between said piston and said exhaust valve while preventing flow in the reverse direction, said outlet port communicating at all times with the space between said piston and said exhaust valve whereby fluid pressure in said spring actuator is trapped between said piston and said exhaust valve when the latter is closed, the effective cross sectional area of said first piston being greater than the effective cross sectional area of said inlet valve, fluid pressure from said port at said inlet port constantly acting on said first piston when said inlet valve is closed to maintain the latter in closed position and acting on the side of said second piston opposite the side facing said exhaust valve when said outlet valve is closed to maintain the latter in closed position, and resilient means positioned in said first bore around said plunger and interposed said first piston and the casing for closing the inlet valve and opening the exhaust valve to release the pressure trapped in said spring actuator and disconnect the source from the outlet port when the pressure at the source drops below a predetermined value.

8. The system of claim 6 including manual means for effecting movement of said piston and said valves.

References Cited in the file of this patent
UNITED STATES PATENTS

| | | |
|---|---|---|
| 2,310,516 | Clark | Feb. 9, 1943 |
| 2,706,487 | Wilson | Apr. 19, 1955 |
| 3,022,796 | Cummings | Feb. 27, 1962 |
| 3,087,760 | Valentine et al. | Apr. 30, 1963 |